United States Patent
Fernandez Cruz

(10) Patent No.: US 12,447,947 B2
(45) Date of Patent: Oct. 21, 2025

(54) ROAD CONDITION DETECTION USING SUSPENSION SENSORS

(71) Applicant: GM Global Technology Operations LLC, Detroit, MI (US)

(72) Inventor: Joel A. Fernandez Cruz, Ferndale, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/604,950

(22) Filed: Mar. 14, 2024

(65) Prior Publication Data

US 2025/0289411 A1  Sep. 18, 2025

(51) Int. Cl.
*B60W 30/02* (2012.01)
*B60W 10/04* (2006.01)
(Continued)

(52) U.S. Cl.
CPC .......... *B60W 30/025* (2013.01); *B60W 10/04* (2013.01); *B60W 10/18* (2013.01);
(Continued)

(58) Field of Classification Search
CPC ...... B60W 10/04; B60W 10/18; B60W 10/22; B60W 30/025; B60W 30/09; B60W 30/12; B60W 30/16; B60W 40/06; B60W 50/14; B60W 2555/20; B60W 2556/45; B60W 2552/15; B60W 2552/20; B60W 2552/30;
(Continued)

(56) References Cited

U.S. PATENT DOCUMENTS

| 7,931,282 B2 * | 4/2011 | Kolp | B60G 17/016 |
| | | | 280/5.514 |
| 2005/0212225 A1 * | 9/2005 | Suzuki | B60G 17/0523 |
| | | | 280/5.514 |

(Continued)

FOREIGN PATENT DOCUMENTS

| DE | 102016101283 A1 | 8/2016 |
| DE | 112017003866 T5 | 4/2019 |

OTHER PUBLICATIONS

German Office Action for German Application No. 102024113073.3; dated Feb. 24, 2025; 6 pages.

*Primary Examiner* — Hai H Huynh
*Assistant Examiner* — Johnny H Hoang
(74) *Attorney, Agent, or Firm* — CANTOR COLBURN LLP

(57) ABSTRACT

A method for controlling a traction control system, ABS and actively controlled suspension. The method includes receiving an sensor output from at least one suspension sensor at a controller. The sensor output is indicative of a vertical height of the suspension relative to a road. The method determines an amplitude of vertical motion of the suspension over time using the received sensor output. The method identifies peaks and valleys in the amplitude of vertical motion of the suspension over time. The method determines that a rough road condition is present in response to a number of peaks and valleys exceeding a predefined threshold amplitude occurring more often than a predefined threshold frequency. An active suspension control of at least one wheel system of a vehicle is adapted in response to determining that a rough road condition is present.

20 Claims, 3 Drawing Sheets

(51) Int. Cl.
*B60W 10/18* (2012.01)
*B60W 10/22* (2006.01)

(52) U.S. Cl.
CPC ......... *B60W 10/22* (2013.01); *B60W 2520/00* (2013.01); *B60W 2552/35* (2020.02)

(58) Field of Classification Search
CPC ......... B60W 2552/35; B60W 2552/40; B60W 2422/70; B60W 2720/10; G01S 13/88; G01S 13/931
USPC ................ 701/37–40, 70, 71, 75, 76, 82, 91
See application file for complete search history.

(56) References Cited

U.S. PATENT DOCUMENTS

| | | | |
|---|---|---|---|
| 2011/0301821 A1* | 12/2011 | Bujak | B60G 17/0195 |
| | | | 701/70 |
| 2013/0238198 A1* | 9/2013 | Prentice | B62D 35/02 |
| | | | 296/180.1 |
| 2017/0032592 A1* | 2/2017 | Lu | G07C 5/0808 |
| 2017/0096144 A1* | 4/2017 | Elie | B60G 17/0165 |
| 2017/0267045 A1* | 9/2017 | Ikeda | B62K 25/08 |
| 2017/0293814 A1* | 10/2017 | Elie | G06V 20/588 |
| 2022/0281456 A1* | 9/2022 | Giovanardi | G06V 20/58 |
| 2023/0347853 A1* | 11/2023 | Person | B60G 17/0195 |

* cited by examiner

ROAD CONDITION DETECTION USING SUSPENSION SENSORS

INTRODUCTION

The subject disclosure relates to vehicle chassis controls, and more particularly to a system for detecting and predicting road conditions using suspension sensors.

In some examples, modern vehicles include active suspensions that adjust the vehicle suspension to adapt the stiffness of the suspension for the road conditions and thereby improve performance of the vehicle. Typically such systems monitor suspension acceleration, velocity and/or position and make decisions on suspension stiffness to try and maintain vehicle comfort.

The approach and physics behind such systems are configured to consider and optimize what will be felt by passengers in the cabin. Although comfort can be maintained in different road conditions using the existing systems, accelerations and braking performance can be affected due to variation in road conditions.

As such, it is desirable to use the sensors provided by an active suspension configured to detect a road condition, and extrapolate one or more desirable adjustments to an active suspension and chassis control based on the detected road conditions.

SUMMARY

One exemplary embodiment includes a method for controlling a traction control system, anti-lock braking system (ABS) and actively controlled suspension. The method includes receiving an sensor output from at least one suspension sensor at a controller. The sensor output is indicative of a vertical height of the suspension relative to a road. The method determines an amplitude of vertical motion of the suspension over time using the received sensor output. The method identifies peaks and valleys in the amplitude of vertical motion of the suspension over time. The method determines that a rough road condition is present in response to a number of peaks and valleys exceeding a predefined threshold amplitude occurring more often than a predefined threshold frequency. An active suspension control of at least one wheel system of a vehicle is adapted in response to determining that a rough road condition is present.

In addition to one or more of the features described herein receiving the sensor output from at least one suspension sensor includes receiving a plurality of sensor outputs from a plurality of suspension sensors, each suspension sensor in the plurality of suspension sensor corresponding to a distinct suspension.

In addition to one or more of the features described herein at least two suspension sensors in the plurality of suspension sensors are front wheel system suspension sensors.

In addition to one or more of the features described herein the plurality of sensor outputs from the plurality of suspension sensors includes a first set of sensor outputs from a first set of sensors and a second set of outputs from a second set of sensors, the first set of sensors being disposed in one or more front wheel systems of a vehicle, and the second set of sensors being disposed in one or more rear wheel systems of the vehicle.

In addition to one or more of the features described herein the method further includes, in some embodiments, verifying the determination that a rough road condition is present by iterating the method on the second set of outputs from the second set of sensors.

In addition to one or more of the features described herein the at least one suspension sensor includes one of a linear potentiometer, a velocity sensor, and an accelerometer.

In addition to one or more of the features described herein determining that a rough road condition is present in response to a number of peaks and valleys exceeding a predefined threshold amplitude occurs more often than a predefined threshold frequency comprises identifying one of multiple distinct road roughness conditions based on a frequency of peaks and valleys defining an amplitude exceeding the predefined threshold amplitude.

In another exemplary embodiment a vehicle includes a plurality of wheel systems. Each wheel system in the plurality of wheel systems includes at least one suspension sensor. A controller is communicatively coupled with each wheel system in the plurality of wheel systems. The controller includes a memory configured to respond to receiving a sensor output from the at least one suspension sensor by determining an amplitude of vertical motion of a corresponding suspension over time using the received sensor output, identifying peaks and valleys in the amplitude of vertical motion of the corresponding suspension over time, determining that a rough road condition is present in response to a number of peaks and valleys exceeding a predefined threshold amplitude occurring more often than a predefined threshold frequency, and adapting a control of at least one wheel system of the plurality of wheel systems in response to determining that a rough road condition is present.

In addition to one or more of the features described herein the at least one wheel system includes an active suspension and wherein adapting the control of at least one wheel system in response to determining that the rough road condition is present comprises adapting the active suspension control of each wheel system in the plurality of wheel systems.

In addition to one or more of the features described herein at least two wheel systems in the plurality of wheel systems are front wheel systems.

In addition to one or more of the features described herein the sensor output from the at least one suspension sensor includes a sensor output from a first suspension sensor of a first front wheel system and a second sensor output from a second suspension sensor of a second front wheel system.

In addition to one or more of the features described herein the controller is further configured to verify determination that a rough road condition is present by iterating determining an amplitude of vertical motion of a corresponding actively controlled suspension over time using the received sensor output, identifying peaks and valleys in the amplitude of vertical motion of the corresponding actively controlled suspension over time, and determining that a rough road condition is present in response to a number of peaks and valleys exceeding a predefined threshold amplitude occurring more often than a predefined threshold frequency using sensor data from at least one rear wheel system.

In addition to one or more of the features described herein the first suspension sensor is one of a linear potentiometer, a velocity sensor, and an accelerometer and the second suspension sensor is one of a linear potentiometer, a velocity sensor, and an accelerometer.

In addition to one or more of the features described herein the first suspension sensor and the second suspension sensor are the same type of sensor.

In addition to one or more of the features described herein determining that a rough road condition is present in response to a number of peaks and valleys exceeding a predefined threshold amplitude occurs more often than a predefined threshold frequency comprises identifying one of multiple distinct road roughness conditions based on the frequency of peaks and valleys defining an amplitude exceeding the predefined threshold amplitude.

In addition to one or more of the features described herein A controller includes a processor and a memory. The memory stores instructions configured to cause the controller to respond to receiving a sensor output from at least one suspension sensor by determining an amplitude of vertical motion of a suspension including the at least one suspension sensor over time using the received sensor output, identify peaks and valleys in the amplitude of vertical motion of the suspension including the at least one suspension sensor over time, and determining, in a first determination, that a rough road condition is present in response to a number of peaks and valleys exceeding a predefined threshold amplitude occurring more often than a predefined threshold frequency.

In addition to one or more of the features described herein the controller is further configured to output a suspension control signal and wherein the suspension control signal is dependent on a determined road condition.

In addition to one or more of the features described herein determining the amplitude of vertical motion of the suspension including the at least one suspension sensor over time using the received sensor output comprises mathematically deriving the amplitude of vertical motion of the suspension.

In addition to one or more of the features described herein the memory further stores instructions configured to cause the controller to verify the determined rough road condition using a received second sensor output from at least one second suspension sensor by determining the amplitude of vertical motion of the actively controlled suspension including the at least one suspension sensor over time using the received second sensor output, identifying peaks and valleys in the amplitude of vertical motion of the suspension including the at least one suspension sensor over time using the second sensor output, and determining, in a second determination, that the rough road condition is present in response to a number of peaks and valleys exceeding a predefined threshold amplitude occurring more often than a predefined threshold frequency and comparing the first determination to the second determination.

In addition to one or more of the features described herein the memory is configured to cause the controller to determine that the first determination is accurate in response to the first determination and the second determination matching.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
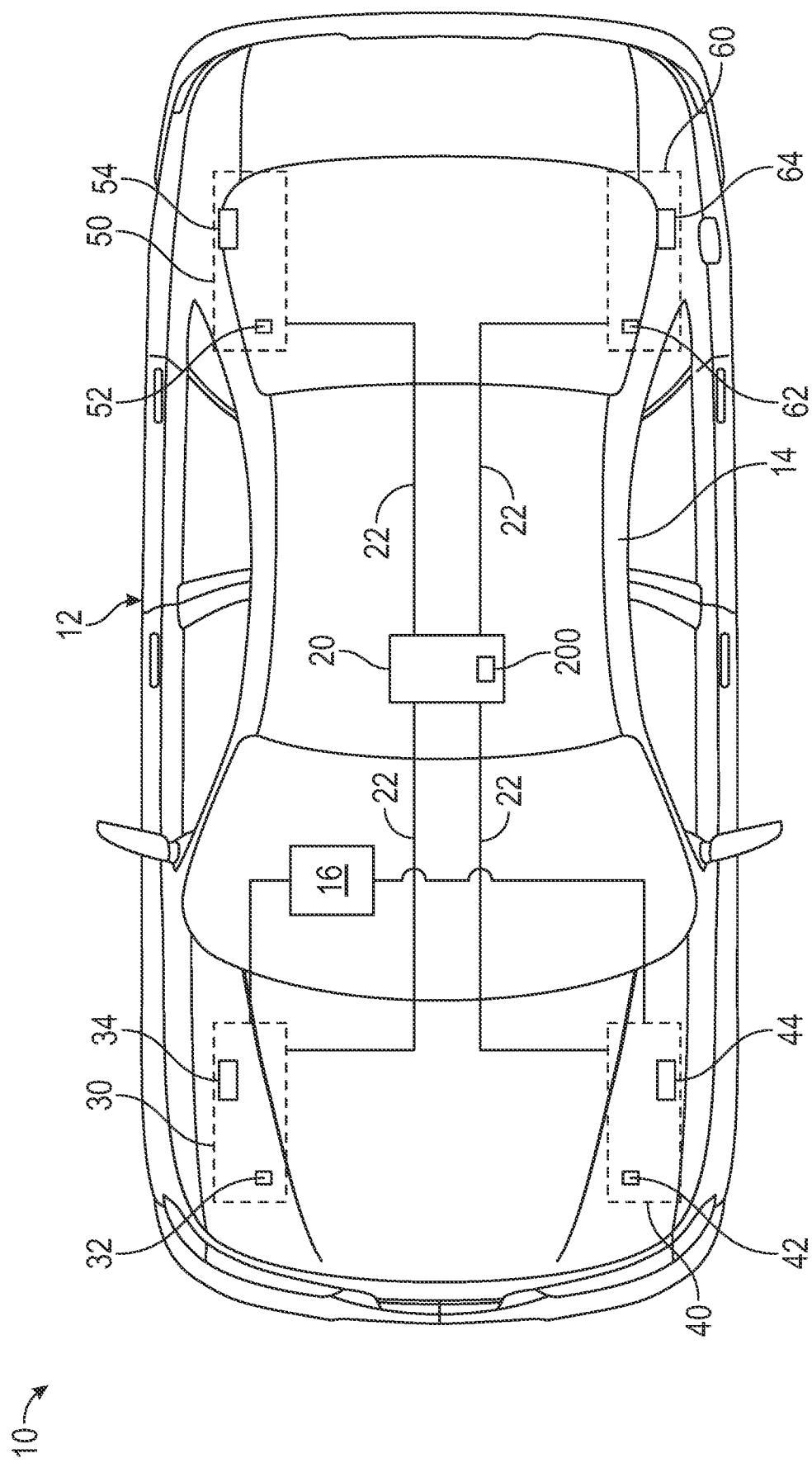
FIG. 1 is a top view of a motor vehicle including active suspension control.

The following description is merely exemplary in nature and is not intended to limit the present disclosure, its application or uses. It should be understood that throughout the drawings, corresponding reference numerals indicate like or corresponding parts and features.

In accordance with an exemplary embodiment methods, devices and systems are provided for monitoring a suspension during operation of a vehicle using multiple suspension sensors. Data describing position, velocity, and acceleration of the suspension is gathered by the suspension sensors and is used to create road profiles. The road profiles are then analyzed for amplitudes and frequencies which are associated with different road conditions. Based on the analysis a closest road profile is identified, with the road profile indicating a roughness characteristic of the road. The controller adjusts active suspension, traction control and/or anti-lock braking system (ABS) parameters based on the road roughness characteristic and vehicle performance and comfort are improved.

Embodiments described herein present numerous advantages and technical effects including allowing the controller to determine a current road roughness characteristic and forecast an expected road roughness, thereby allowing for the controller to adjust accordingly. Furthermore, in some specific embodiments the controller may utilize data from additional sensors to periodically confirm the accuracy of the main results and/or provide redundancy in the event of a sensor failure.

The embodiments are not limited to use with any specific vehicle and may be applicable to various contexts. For example, the algorithm described herein may be included in vehicles of any type including electric vehicles (EVs), hybrid electric vehicles, fuel powered vehicles, or any other vehicle type including active suspension control sensors.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, a fuel injection subsystem, an exhaust subsystem and others.

The example vehicle 10 may be an electrically powered vehicle (EV) or a hybrid vehicle. The vehicle 10 includes a first wheel system 30, a second wheel system 40, a third wheel system 50, and a fourth wheel system 60. Each wheel system 30, 40, 50, 60 includes a corresponding active suspension system 34, 44, 54, 64. Each of the active suspension systems 34, 44, 54, 64 is configured to actively control a stiffness of the suspension, thereby maximizing friction control between the wheel systems 30, 40, 50, 60 including the active suspension system 34, 44, 54, 64 and a road on which the vehicle 10 is driving. In the illustrated example, the propulsion system 16 uses one or more electric motors to drive the two front wheel systems 30, 40.

A controller 20 is in two way communication with each of the wheel systems 30, 40, 50, 60 via communication lines 22. The communication is inclusive of communications with any subsystems within the wheel systems 30, 40, 50, 60. While illustrated herein as a singular controller 20 including dedicated separate control lines 22 in communication with each wheel system 30, 40, 50, 60 it is appreciated that the controller 20 may be a single dedicated controller, multiple dedicated controllers in communication with each other controller, processes and/or subprocesses within a controller, or multiple control process distributed across multiple controllers. In addition, it is appreciated that the individual dedicated communication lines 22 may be a combined communication bus, wireless communication, multiple direct communication lines and/or any other form of two way communication.

Each wheel system 30, 40, 50, 60 further includes one or more sensors 32, 42, 52, 62 providing an output that can be used to determine a vertical position of the active suspension 34, 44, 54, 64 at any given time. In some cases, the sensors 32, 42, 52, 62 may directly read the vertical positions, while in other cases the sensors 32, 42, 52, 62 may provide an output from which the vertical positions may be mathematically derived. In some examples, the sensors 32, 42, 52, 62 can be linear potentiometers, velocity sensors, and/or accelerometers. In yet other examples, the sensors 32, 42, 52, 62 in each wheel system 30, 40, 50, 60 can be multiple sensors whose outputs are combined via the controller 20. The controller 20 receives sensor outputs through communication lines 22, and process the outputs from the sensors 32, 42, 52, 62 using an algorithm 200 (see FIG. 2). The algorithm 200 determines road roughness, and the controller 20 causes the active suspension, traction control and ABS systems 34, 44, 54, 64 to adapt to the determined road roughness.

These sensors 32, 42, 52, 62 relay the vertical movement (relative to a ground plane) of the active suspension systems 34, 44, 54, 64 as the vehicle 10 is traveling along a road. The data from the sensors 32, 42, 52, 62 is interpreted by the controller 20 using algorithm 200 (see FIG. 2) as a relative visualization of the road. The visualization is then used to forecast expected road conditions (e.g. how rough the road will be) moving forward, and adapt the active suspension systems 30, 40, 50, 60 accordingly. In some examples, one type of sensor 32, 42, 52, 62 is sufficient for the algorithm 200 to operate as the controller 20 can derive or integrate to get velocity or position from the data provided by any of the sensor types. In one basic example, the expected road conditions may be set as the current road condition until the vehicle 10 turns. In another example, the expected road conditions may be set as a most prevalent road condition of a previous time duration (e.g. the previous minute). This time duration may be a recalculated rolling duration or repeated discrete durations.

Figure 3:
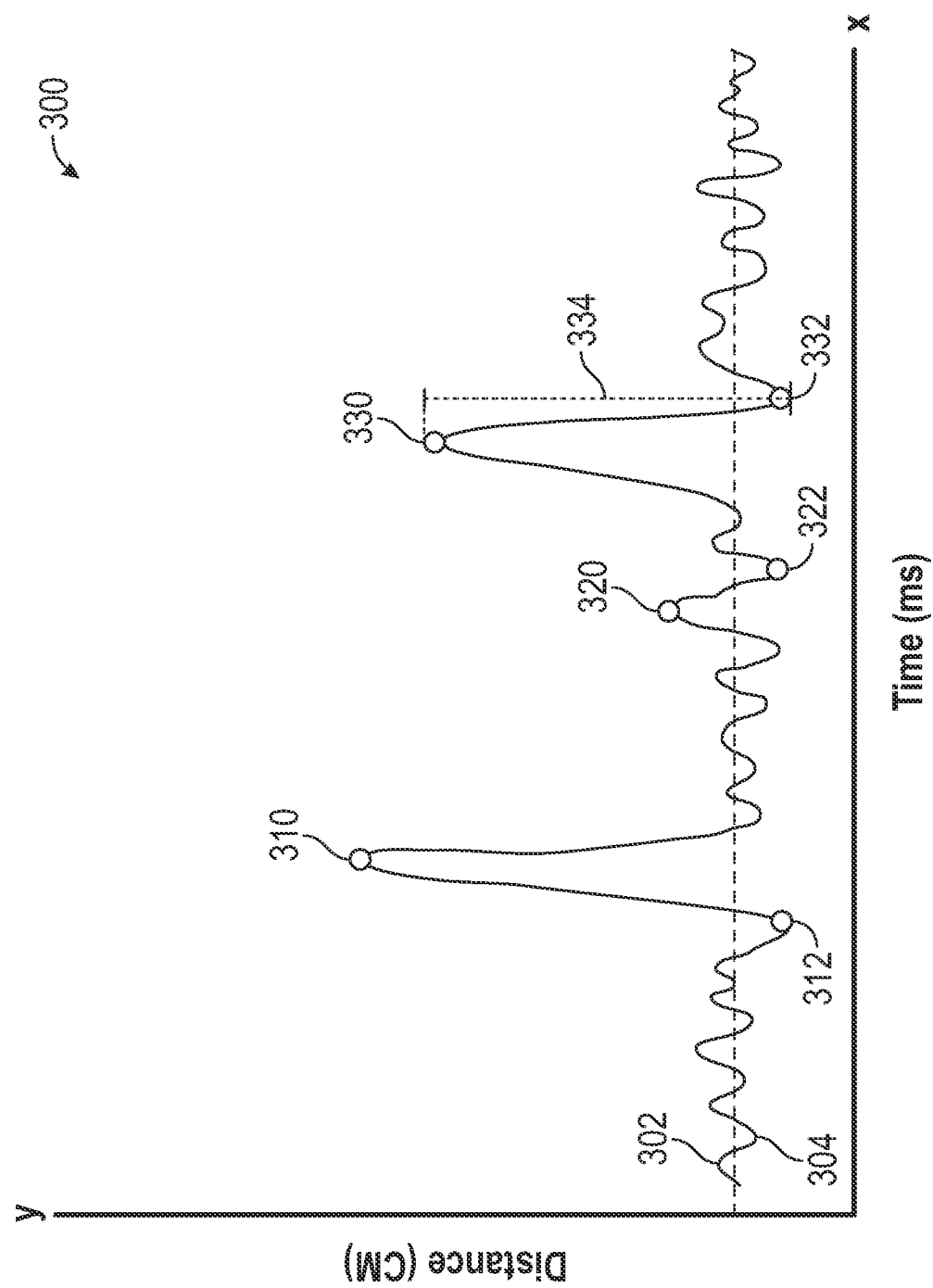
FIG. 3 depicts example sensor data from a single suspension sensor in one example.

As the vehicle 10 travels, the sensors 32, 42, 52, 62 track the movement of the active suspension 34, 44, 54, 64 and react to the road, providing a two-dimensional trace of road conditions. The two-dimensional trace is the visualization, one example of which is illustrated in FIG. 3. Each time the active suspension 34, 44, 54, 64 changes directions from compression to rebound (or vice-versa), the velocity of the active suspension 34, 44, 54, 64 hits zero before changing direction. The 0 velocity point provides a peak or valley position.

Using the velocity and direction provided by the sensors 32, 42, 52, 62, the controller 20 detects these peaks and valleys.

The algorithm 200 analyzes a vertical position of the active suspension system 34, 44, 54, 64 at each peak and valley and determines how much the active suspension system 34, 44, 54, 64 was articulated during the movement of the active suspension system 34, 44, 54, 64 that lead to the peak or valley. The distance that the active suspension system 34, 44, 54, 64 traveled is referred to as the amplitude and the number of times that this movement happened is referred to as a frequency. The amplitude and frequency are combined to provide a road roughness metric according to known analysis techniques.

Figure 2:
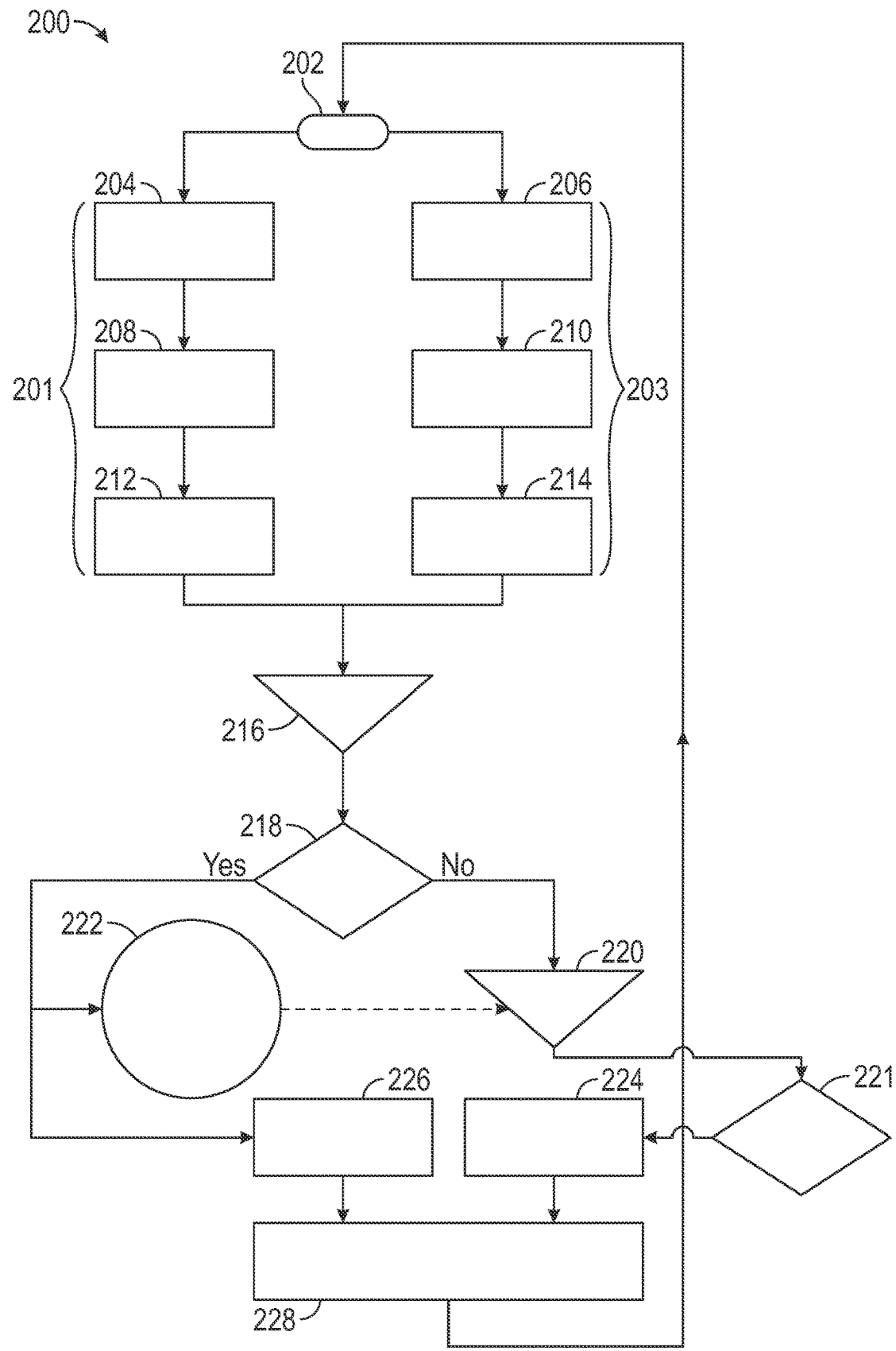
FIG. 2 depicts a process for determining a current road condition based on sensor data from at least one active suspension sensor.

With continued reference to the vehicle 10 of FIG. 1, FIG. 2 illustrates an example algorithm 200 for determining a road roughness using the vehicle 10 configuration illustration in FIG. 1. The algorithm 200 is described with further reference to an example sensor output graph 300 of a single sensor 32, 42 illustrated in FIG. 3. Initially the controller 20 starts the algorithm 200 at a start block 202. And the sensors 32, 42, 52, 62 begin outputting data.

The algorithm 200 then proceeds along two parallel branches 201, 203. The parallel branches 201, 203 operate in the same manner, with the first parallel branch 201 operating on data provided by the sensor(s) 42 in the front left (FL) wheel system 40 and the second parallel branch 203 operating on data provided by the sensor(s) 32 in the front right (FR) wheel system 30.

The algorithm 200 initially measures the travel of the corresponding active suspension systems 34, 44 in Measure FL/FR Suspension Travel steps 204, 206.

The distance traveled is determined from the sensor data. Peaks 302, 310, 320, 330 and valleys 304, 312, 322, 332 are detected in Peak/Valley Detection steps 208, 210. In addition to detecting the peaks 302, 310, 320, 330 and valleys 304, 312, 322, 332, the controller 20 also determines an amplitude of each peak 302, 310, 320, 330 and/or valley 304, 312, 322, 332. The amplitude is the longest distance from a peak to an adjacent valley (or from a valley to an adjacent peak). One example amplitude 334 of a peak 330/valley 332 pair is illustrated for explanatory effect. It is appreciated that every peak 302, 310, 320, 330 and valley 304, 312, 322, 332 has a corresponding amplitude.

In order to account for an expected amount of active suspension system 34, 44 movement even on a smooth road (e.g. a road with a low road roughness metric), an amplitude threshold filter 212, 214 is applied and any peak 302 and/or valley 304, with an amplitude less than a threshold is filtered out.

Each time the amplitude threshold is exceeded, the algorithm 200 proceeds to a first counter 216. In the example sensor output graph 300, the amplitude threshold is exceeded at peaks 310, 320, 330, which correspond to valleys 312, 322, 332. The counter 216 is incremented any time the amplitude threshold is exceed by either of the sensors 32, 42, and the incremented first counter 216 value is compared against a first threshold 218.

When the first threshold 218 is not exceeded, a second counter 220 is incremented. The second counter 220 represents the amount of time that has passed since rough road detection was indicated. When the second counter 220 exceeds a second threshold 221, and the controller 20 determines that a rough road has not been detected at Rough Road (RR) Not Detected step 224.

When the first threshold 218 is exceeded, the controller 20 determines that a rough road has been detected at RR Detected step 226. Simultaneously with the rough road detection, the algorithm 200 resets the second counter 220 via a reset 222. As indicated by the use of a dashed line, the reset 222 does not continue the algorithm 200 through the second counter 220.

After either the RR detected step 226, or the RR not detected step 224, a road flag identifying a roughness of the road is set in a Set Road Flag step 228, and the algorithm 200 returns to the start block 202 and reiterates.

As described herein, the algorithm 200 is operated utilizing both the front right and the front left wheel systems 30, 40. However, it is appreciated that either of the parallel branches 201, 203 may be omitted and functionality of the algorithm 200 maintained with minimal adaption. In this way, the usage of both parallel branches 201, 203 provides a redundancy.

In yet further examples, the same algorithm 200 may be applied to data from the sensors 52, 62 in the rear wheel system 50, 60. It is appreciated that while traveling straight the vehicle 10 should experience approximately the same data (see sensor output table 300) at both the front wheel system 30, 40 and the rear wheel system 50, 60. Based on this understanding the results of the algorithm 200 applied to the rear wheel system 50, 60 can be used to verify accuracy of the algorithm 200 and ensure that none of the sensor systems 32, 42, 52, 62 is providing an erroneous value. When the results agree, the controller 20 determines that there is no inaccuracy present.

Application of the algorithm 200 allows the controller 20, or another controller within the vehicle 10, to improve braking and acceleration performance by identifying and anticipating rough road conditions. A clear distinction of road roughness helps the controller utilize calibration tables specific to a road roughness bracket thereby enhancing vehicle performance and reducing power hop in the suspension systems.

While the algorithm 200 is configured to differentiate between a binary "rough road" and "not rough road" condition, it is appreciated that the algorithm 200 could be modified to identify one of three roughness states by including multiple thresholds at the first threshold 218 directing to "low roughness", "no roughness", and "high roughness." Similar modifications are anticipated that could increase the differentiation to any number of discrete roughness ranges, thereby further improving the performance of the vehicle 10.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for controlling at least one of a traction control system, antilock braking system (ABS) and actively controlled suspension comprising:
   receiving an sensor output from at least one suspension sensor at a controller, the sensor output being indicative of a vertical height of the actively controlled suspension relative to a road;
   determining an amplitude of vertical motion of the actively controlled suspension over time using the received sensor output;
   identifying peaks and valleys in the amplitude of vertical motion of the actively controlled suspension over time;
   determining that a rough road condition is present in response to a number of peaks and valleys exceeding a predefined threshold amplitude occurring more often than a predefined threshold frequency; and
   adapting an active suspension control of at least one wheel system of a vehicle in response to determining that a rough road condition is present.

2. The method of claim 1, wherein receiving the sensor output from at least one suspension sensor comprises receiving a plurality of sensor outputs from a plurality of suspension sensors, each suspension sensor in the plurality of suspension sensor corresponding to a distinct suspension.

3. The method of claim 2, wherein at least two suspension sensors in the plurality of suspension sensors are front wheel system suspension sensors.

4. The method of claim 2, wherein the plurality of sensor outputs from the plurality of suspension sensors includes a first set of sensor outputs from a first set of sensors and a second set of outputs from a second set of sensors, the first set of sensors being disposed in one or more front wheel systems of a vehicle, and the second set of sensors being disposed in one or more rear wheel systems of the vehicle.

5. The method of claim 4, further comprising verifying the determination that a rough road condition is present by iterating the method on the second set of outputs from the second set of sensors.

6. The method of claim 1, wherein the at least one suspension sensor includes one of a linear potentiometer, a velocity sensor, and an accelerometer.

7. The method of claim 1, wherein determining that a rough road condition is present in response to a number of peaks and valleys exceeding a predefined threshold amplitude occurs more often than a predefined threshold frequency comprises identifying one of multiple distinct road roughness conditions based on a frequency of peaks and valleys defining an amplitude exceeding the predefined threshold amplitude.

8. A vehicle comprising:
   a plurality of wheel systems, each wheel system in the plurality of wheel systems including at least one suspension sensor;
   a controller communicatively coupled with each wheel system in the plurality of wheel systems, the controller including a memory configured to respond to receiving a sensor output from the at least one suspension sensor by determining an amplitude of vertical motion of a corresponding suspension over time using the received sensor output;
   identifying peaks and valleys in the amplitude of vertical motion of the corresponding suspension over time;
   determining that a rough road condition is present in response to a number of peaks and valleys exceeding a predefined threshold amplitude occurring more often than a predefined threshold frequency; and adapting a control of at least one wheel system of the plurality of wheel systems in response to determining that a rough road condition is present.

9. The vehicle of claim 8, wherein the at least one wheel system includes an active suspension, and wherein adapting a control of the active suspension of the at least one wheel system of the plurality of wheel systems in response to determining that the rough road condition is present comprises adapting the active suspension control of each wheel system in the plurality of wheel systems.

10. The vehicle of claim 8, wherein at least two wheel systems in the plurality of wheel systems are front wheel systems.

11. The vehicle of claim 10, wherein the sensor output from the at least one suspension sensor includes a sensor output from a first suspension sensor of a first front wheel system and a second sensor output from a second suspension sensor of a second front wheel system.

12. The vehicle of claim 11, wherein the controller is further configured to verify determination that a rough road condition is present by iterating determining an amplitude of vertical motion of a corresponding actively controlled suspension over time using the received sensor output, identifying peaks and valleys in the amplitude of vertical motion of the corresponding actively controlled suspension over time, and determining that a rough road condition is present in response to a number of peaks and valleys exceeding a predefined threshold amplitude occurring more often than a predefined threshold frequency using sensor data from at least one rear wheel system.

13. The vehicle of claim 11, wherein the first suspension sensor is one of a linear potentiometer, a velocity sensor, and an accelerometer and the second suspension sensor is one of a linear potentiometer, a velocity sensor, and an accelerometer.

14. The vehicle of claim 13, wherein the first suspension sensor and the second suspension sensor are a same type of sensor.

15. The vehicle of claim 8 wherein determining that a rough road condition is present in response to a number of peaks and valleys exceeding a predefined threshold amplitude occurs more often than a predefined threshold frequency comprises identifying one of multiple distinct road roughness conditions based on a frequency of peaks and valleys defining an amplitude exceeding the predefined threshold amplitude.

16. A controller comprising:
a processor and a memory, the memory storing instructions configured to cause the controller to respond to receiving a sensor output from at least one suspension sensor by determining an amplitude of vertical motion of a suspension including the at least one suspension sensor over time using the received sensor output, identify peaks and valleys in the amplitude of vertical motion of the suspension including the at least one suspension sensor over time, and determining, in a first determination, that a rough road condition is present in response to a number of peaks and valleys exceeding a predefined threshold amplitude occurring more often than a predefined threshold frequency.

17. The controller of claim 16, wherein the controller is further configured to output a suspension control signal and wherein the suspension control signal is dependent on a determined road condition.

18. The controller of claim 16, wherein determining the amplitude of vertical motion of the suspension including the at least one suspension sensor over time using the received sensor output comprises mathematically deriving the amplitude of vertical motion of the suspension.

19. The controller of claim 16, wherein the memory further stores instructions configured to cause the controller to verify the determined rough road condition using a received second sensor output from at least one second suspension sensor by determining the amplitude of vertical motion of an actively controlled suspension including the at least one suspension sensor over time using the received second sensor output, identifying peaks and valleys in the amplitude of vertical motion of the suspension including the at least one suspension sensor over time using the second sensor output, and determining, in a second determination, that the rough road condition is present in response to a number of peaks and valleys exceeding a predefined threshold amplitude occurring more often than a predefined threshold frequency and comparing the first determination to the second determination.

20. The controller of claim 19, wherein the memory is configured to cause the controller to determine that the first determination is accurate in response to the first determination and the second determination matching.

* * * * *